United States Patent Office 3,006,946
Patented Oct. 31, 1961

3,006,946
PRODUCTION OF HETEROCYCLIC PHOSPHORUS-CONTAINING COMPOUNDS AND PRODUCTS
William M. Lanham, Charleston, W. Va., assignor to Union Carbide Corporation, a corporation of New York
No Drawing. Filed Mar. 4, 1953, Ser. No. 340,399
16 Claims. (Cl. 260—461)

This invention relates to the production of novel 5- and 6-membered heterocyclic phosphorus-containing compounds; and more especially it concerns the production of 2-substituted derivatives of 2-oxo-1,3,2-dioxaphospholanes and 2-oxo-1,3,2-dioxaphosphorinanes containing four oxygen atoms directly connected with the phosphorus atom of the ring. These heterocyclic compounds may be designated by the formula

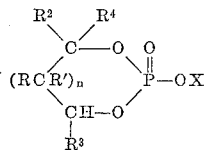

wherein R, R', $R^2$, $R^3$, and $R^4$ represent hydrogen or an alkyl group; $n=0$ or 1; and X represents a radical of the class consisting of the hydrocarbon radicals and the halogen-substituted, alkoxy-substituted, polyoxyethylene-substituted, polyoxypropylene-substituted and nitro-substituted hydrocarbon radicals. Preferably X represents a radical selected from the group of alkyl, haloalkyl, cyanoalkyl, alkoxyalkyl, haloalkoxyalkyl, hydroxyalkyl, aryl, nitroaryl, haloaryl, $$-(CHR^5CH_2O)_xH$$

and $-(CHR^5CH_2O)_y(CH_2CH_2O)_{y'}H$

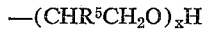

wherein $R^5$ is hydrogen or methyl, $x$ is 1 to 50, $y$ is 1 to 25 and $y'$ is 1 to 25.

These heterocyclic phosphorus-containing esters are good solvents and are useful plasticizers for various synthetic resins. They also have been found useful in the processing of textiles made from synthetic resins, and in various applications where a biologically active compound is desired. They also are useful intermediates for the production of various new compounds.

In accordance with one form of the invention, these novel compounds can be made by reacting phosphoryl chloride, preferably in approximately equimolecular proportions, with a glycol of the type $HOCR_2(CR_2)_mCHROH$ where $m$ is 0 or 1 and R is hydrogen or an alkyl group. The resultant 2-halo-2-oxo-1,3,2-dioxaphosphorinane then is reacted with at least one molar equivalent of an aliphatic or aromatic compound containing a single alcoholic or phenolic hydroxyl group, or an alkali metal alkoxide or phenoxide, and the hydrogen chloride formed in the reaction is removed as formed. Preferably, one of the reactants, commonly the 2-halo-2-oxo-1,3,2-dioxaphosphorinane, is added slowly to the other reactant to control the temperature and rate of the reaction.

The hydrogen chloride formed in this reaction can be removed as formed in three different ways, hereinafter illustrated. In one method the mixture of reactants and a refluxing medium is heated under subatmospheric pressure, which facilitates removal of the hydrogen chloride.

When the alcoholic reactant contains more than six carbon atoms the reaction preferably is conducted at a temperature range of from about 50° to 125° C. When a lower alcohol, such as ethanol, is used, temperatures of 0° to 25° C. conveniently can be used.

The reaction also can be conducted in the presence of a hydrogen chloride sequestering agent, conveniently a tertiary amine such as pyridine, and an inert diluent, such as benzene, toluene, diethyl ether, dibutyl ether, ethylene dichloride and benzyl chloride. Preferably one of the reactants is fed stepwise to the mixture of the other reactant and sequestering agent at reaction temperatures of approximately 25° C. The temperature can be increased to 125° C. if needed to complete the reaction.

When using an alkali metal alkoxide or phenoxide as one of the reactants the reaction conveniently is conducted at temperatures within the range from 25° C. to 0° C. or lower. Where the hydroxyl group of the hydroxy compound reactant becomes more acidic due to substitution on the ring, e.g., nitrophenol, it is convenient to use the anhydrous alkali metal nitrophenoxide derivative, and to conduct the reaction at temperatures of about 100° to 130° C. in the presence of a tertiary amine catalyst such as triethylamine, as exemplified in Example 12.

The novel compounds of the invention also can be made by first reacting a phosphoryl chloride or bromide with one of the aforesaid compounds containing a single alcoholic or phenolic hydroxyl group under conditions yielding a corresponding dihalophosphate ester and releasing hydrogen halide. The said ester is recovered and reacted in approximately equimolar proportions with a glycol of the type $HOCR_2(CR_2)_mCHROH$ where $m$ is 0 or 1, and R is hydrogen or an alkyl group. This conveniently is effected by adding the said dihalophosphate ester dropwise to a solution of the glycol in a volatile inert solvent held at temperatures up to 125° C. under subatmospheric pressure. The reaction mixture then is refluxed under vacuum before neutralizing the residual acidic by-products with a methanol solution of sodium hydroxide. The residual mixture is washed with water and then is stripped of volatile compounds, preferably under vacuum. The desired derivative of 2-oxo-1,3,2-dioxaphospholane or of 2-oxo-1,3,2-dioxaphosphorinane can be fractionally distilled from the mixture and recovered.

Among alkane-1,2-diols and alkane-1,3-diols useful in certain modifications of the process, are ethanediol-1,2;- propanediol-1,2; butanediol-1,2; ethylethanediol-1,2; 1,2-dimethylethanediol-1,2; propanediol-1,3; butanediol-1,3; pentanediol-1,3; hexanediol-1,3; 2-ethylhexanediol-1,3; 2-butyl-2-ethyl-propanediol-1,3; and pentanediol-2,4.

The 2-halo-2-oxo-1,3,2-dioxaphosphorinane and corresponding dioxaphospholane derivatives used in certain forms of the invention conveniently are made by the dropwise addition of alkane-1,3-diol or an alkane-1,2-diol, respectively, to phosphoryl chloride, preferably in approximately equimolecular proportions, or to a solution of such a phosphoryl chloride in an inert hydrogen chloride sequestering agent, such as pyridine, and an inert low-boiling solvent for the reactants such as ethyl ether. Thus, 2 - chloro - 5 - ethyl - 2 - oxo - 4 - propyl-1,3,2-dioxaphosphorinane was prepared in high yield by slowly adding (over a period of 1.75 hours) 584 grams (4 mols) of 2-ethyl-1,3-hexanediol to 614 grams (4 mols) of phosphoryl chloride while maintaining the reaction mixture at 25° C. under 500 mm. of mercury pressure. The reaction mixture was then kept at 25° C. under 350 mm. of mercury pressure for one hour, and finally overnight at 25° C. under 5 mm. of mercury pressure, thus eliminating the hydrogen chloride produced. The residual 2 - chloro - 5 - ethyl - 2 - oxo - 4 - -propyl - 1,3,2-dioxaphosphorinane thus prepared had a molecular weight of 232 (theory=226.6), and a chlorine content of 16.02% (theory 15.6%).

Among useful aliphatic and aromatic compounds containing a single alcoholic or phenolic hydroxyl radical useful in the process may be mentioned alkanols such as methanol, ethanol, butanol, 2-ethylbutanol, the hexanols, the octanols, 2-ethylhexanol-1, the decanols, and the hexadecanols; cyclohexanol; cyanoalkanols such as 2-cyanoethanol and 2-cyanoisopropanol; haloalkanols such as 2-chloroethanol, 2-bromoethanol, 2-chloroisopropanol, 4-chloro-1-butanol, and 4-bromo-1-butanol; alkoxyalkanols and haloalkoxyalkanols such as the methoxy, ethoxy, butoxy and hexyloxy ethanols and isopropanols, 2-chloroethoxyethanol, 2-bromoethoxyethanol, 2-chloroisopropoxyethanol, 2-ethylhexyloxyethanol and octyloxyisopropanol; arylkanols such as benzyl alcohol and 2-phenylethanol; aryloxyalkanols such as 2-phenoxyethanol, and 2-(2,4-dichlorophenoxy)ethanol; and aromatic hydroxy compounds such as phenol, p-nitrophenol, o,p-dichlorophenol, o-chlorophenol, and o-bromophenol.

Alkoxides and phenoxides useful in the process include the alkali metal salts of monohydric alcohols and phenols such as sodium methoxide, sodium butoxide, sodium phenoxide, sodium p-methylphenoxide, sodium p-nitrophenoxide, and sodium o,p-dichlorophenoxide.

The alkoxy derivatives of the 2-oxo-1,3,2-dioxaphospholanes of the invention differ materially from the corresponding derivatives of the 2-oxo-1,3,2-dioxaphosphorinanes in being less stable than the latter to hydrolysis, and the direction of the reaction involved in their production is more difficult to control.

The following examples serve to illustrate the invention:

*Example 1*

During one hour 442 grams (1.95 mols) of 2-chloro-5 - ethyl - 2 - oxo - 4 - propyl - 1,3,2 - dioxaphosphorinane were added to 650 grams (5 mols) of 2-ethylhexanol held at 55° C. under a pressure of 40 mm. of mercury. The reaction mixture then was refluxed at a kettle temperature of 100° C. under 24 mm. of mercury pressure for 18 hours. It then was neutralized with a 20% methanolic solution of sodium hydroxide, stripped by pot distillation to a kettle temperature of 120° C. under 2 mm. of mercury pressure, filtered, and finally stripped at 78° C. under a pressure of 0.15 mm. of mercury, using a falling film type still. The residue was distilled at 150° C. under 0.18 mm. of mercury pressure in such still. The colorless distillate, 2-(2-ethylhexyloxy)-5-ethyl-2-oxo-4-propyl-1,3,2-dioxaphosphorinane, had the following properties: Specific gravity 25°/15°=1.014; $n_D^{30°}=1.4493$.

This example was repeated. The aforesaid product had the following properties and analysis:

| | Analysis, wt. percent | | | Mol. wt. | Sp. gr. at 25°/15° C. |
|---|---|---|---|---|---|
| | C | H | P | | |
| Theory | 59.95 | 10.38 | 9.67 | 320 | |
| Found | 60.24 | 10.50 | 9.63 | 323 | 1.014 |

*Example 2*

To an agitated solution of 40 grams (0.5 mol) of pyridine, 65 grams (0.5 mol) of 2-ethylhexanol and 250 cc. of benzene at a kettle temperature of 20°–25° C. were added 78 grams (0.5 mol) of crude 2-chloro-4-methyl-2-oxo-1,3,2-dioxaphospholane. The reaction mixture was stirred at 25° C. for 2 hours, and heated at 50° C. for 4 hours, filtered at 0° C., and the residue was washed with ethyl ether. The filtrate was stripped by pot distillation at 75° C. under 2 mm. of mercury pressure, and the colorless liquid residue was stripped at 78° C. under pressure of 1 mm. of mercury in a falling film type still, and then distilled at 150° C. under a pressure of less than 0.2 mm. of mercury. The colorless distillate, 2 - (2 - ethylhexyloxy) - 4 - methyl - 2 - oxo - 1,3,2 - dioxapholane, secured in 77 gram yield, had $$n_D^{30°}=1.4400$$

a specific gravity at 25°/15°=1.060; molecular weight= 272.8 (theory=250.3); and a phosphorus analysis of 12.60% (theory=12.38%).

*Example 3*

To an agitated solution of 200 cc. of benzene, 158 grams (2 mols) of pyridine and 92 grams (2 mols) of anhydrous ethanol held at 25°–30° C. there was added dropwise during 25 minutes a solution of 213 grams (1 mol) of 2-chloro-5-methyl-2-oxo-5-propyl-1,3,2-dioxaphosphorinane and 50 cc. of benzene. The reaction mixture was heated at 70° C. for four hours, filtered and the filtrate stripped by distillation to a kettle temperature of 100° C. under a pressure of less than 2 mm. of mercury. The residue then was washed with aqueous sodium hydroxide and then with water until neutral to litmus. The washed residue then was stripped by distillation at 100° C. under a pressure of less than 2 mm. of mercury. The 2 - ethoxy - 5 - methyl - 2 - oxo - 5 - propyl - 1,3,2 - dioxaphosphorinane was recovered as a liquid residue product having a sp. gr. 25°/15° of 1.121; $n_D^{30°}=1.4457$; and a phosphorus analysis of 13.9% by weight (theory= 13.93%).

*Example 4*

To a solution consisting of 140 grams (0.96 mol) of 2-ethyl-1,3-hexanediol and 250 grams of benzyl chloride was added, dropwise, 239 grams (0.97 mol) of 2-ethylhexyl dichlorophosphate, at a kettle temperature of 55° C. under a pressure of 40 mm. of mercury. The reaction mixture then was refluxed for 13 hours at from 62° C. under 6 mm. of mercury pressure to 100° C. under 26 mm. of mercury pressure. The mixture then was neutralized with 21% methanolic solution of caustic soda, stripped in a pot still at 100° C. under less than 2 mm. of mercury, and then distilled at 150° C. under a pressure of less than 0.2 mm. of mercury in a falling film type still. An 88% yield of 2-(2-ethylhexyloxy)-5-ethyl-2-oxo - 4 - propyl - 1,3,2 - dioxaphosphorinane was secured in the form of a colorless liquid having a specific gravity at 25°/15°=1.011; $n_D^{30°}=1.4499$; and other properties similar to those of the product of Example 1.

The 2-ethylhexyl dichlorophosphate was produced by reacting equimolar proportions of phosphoryl chloride and 2-ethylhexanol in well-known manner.

*Example 5*

To an agitated solution of 191 grams (1.1 mols) of 2-(2-ethylhexyloxy)ethanol, 79 grams (1 mol) of pyridine and 500 cc. of benzene were added 227 grams (1 mol) of 2-chloro-5-ethyl-2-oxo-4-propyl-1,3,2-dioxaphosphorinane while maintained at 25°–30° C. The mixture then was heated at 70° C. for 9 hours, filtered and the filtrate washed successively with aqueous sodium bicarbonate to neutralization and with water. The washed filtrate was stripped by pot distillation at 100° C. under a pressure of 2.5 mm. of mercury. The residue, 5-ethyl-2-(2-(2-ethylhexyloxy)ethoxy) - 2 - oxo-4-propyl-1,3,2-dioxaphosphorinane, secured in high yield, had a specific gravity at 25°/15° C.=1.0205; $n_D^{30°}=1.4508$; and an equivalent weight of 356 as determined by saponification (theory=363.4).

*Example 6*

To an agitated solution of 119 grams (1.5 mols) of pyridine, 125 grams (1.0 mol) of 2-(2-chloroethoxy)-ethanol and 350 cc. of benzene held at a temperature of 25°–30° C. there were added dropwise during 30 minutes a solution of 213 grams (1.0 mol) of 2-chloro-5,5-diethyl-2-oxo-1,3,2-dioxaphosphorinane and 50 cc. of benzene. The mixture then was held at 70° C. for four hours, cooled, filtered, and the filtrate washed with a solution of 32 grams of sodium hydroxide in 100 cc. of water, then washed three times with water, and stripped by distillation to a kettle temperature of 100° C. under a pressure of less than 2 mm. of mercury. The resultant liquid residue was filtered. The brown liquid filtrate

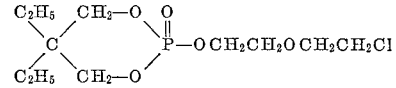

secured in 76% yield, had the following properties: specific gravity at 25°/15°=1.220; $n_D^{30°}$=1.4681; percent chlorine, by weight, 11.95%; (theory=11.79%); acidity=0.05 cc. of a normal solution of KOH per gram.

*Example 7*

To an agitated solution of 119 grams (1.5 mols) of pyridine, 207 grams (1 mol) of 2-(2,4-dichlorophenoxy)-ethanol, and 500 cc. of xylene held at 25°–30° C. were added 226 grams (1 mol) of 2-chloro-5-ethyl-2-oxo-4-propyl-1,3,2-dioxaphosphorinane. After holding the reaction mixture at 60° C. for four hours the pyridine hydrochloride was filtered off. The filtrate was washed successively with dilute aqueous caustic soda and with water, dried over sodium sulfate, and stripped by distillation, the final stripping being conducted at a temperature of 100° C. under 0.15 mm. of mercury pressure in a falling film type still. The residue then was distilled in the same apparatus at 135° C. under 6 microns of mercury pressure. The distillate, 2-[2-(2,4-dichlorophenoxy)ethoxy]-5-ethyl-2-oxo-4-propyl - 1,3,2 - dioxaphosphorinane, had a specific gravity at 30°/15° C.=1.270; $n_D^{30°}$=1.5128; percent chlorine=16.4 (theory=17.8). A yield of about 42% was secured.

*Example 8*

To a solution of 94 grams (1 mol) of phenol, 400 cc. of dioxane, 40 grams (1 mol) of sodium hydroxide and 100 cc. of water maintained at 25°–30° C. were added dropwise 226 grams (1 mol) of 2-chloro-5-ethyl-2-oxo-4-propyl-1,3,2-dioxaphosphorinane. Then 600 cc. of water were added to the reaction mixture. The oil layer which separated was dissolved in xylene, and the xylene solution was washed with 1,500 cc. of water, and then was stripped by pot distillation to a temperature of 120° C. under 2 mm. of mercury pressure. The residue, 253 grams of 5-ethyl-2-oxo-2-phenoxy-4-propyl-1,3,2-dioxaphosphorinane, was distilled at 100° C. under 10 microns pressure in a falling film type still. The distillate, 181 grams, had the following properties: specific gravity at $$\frac{30°}{15°} = 1.158$$

$n_D^{30°}$=1.4949; molecular weight=281 (theory=284).

*Example 9*

To an agitated 32% aqueous solution containing 2 mols of sodium phenoxide held at 0°–5° C. were added during 0.5 hour 482 grams (2 mols) of 5-butyl-2-chloro-5-ethyl-2-oxo-1,3,2-dioxaphosphorinane. Agitation then was discontinued, and the oil layer which separated was isolated, washed with water, made alkaline with 13% methanolic sodium hydroxide, and again washed with water until neutral to litmus. The product was pot distilled to a kettle temperature of 100° C. under 1 mm. of mercury pressure. The residual product, 5-butyl-5-ethyl-2-phenoxy-2-oxo-1,3,2-dioxaphosphorinane, had a specific gravity at 25°/15° C.=1.145; $n_D^{30°}$=1.4980; and an acidity=0.04 cc. of a normal base per gram. It had a phosphorus content of 10.33% by weight (theory=10.38%).

*Example 10*

To a solution of 182 grams (1.24 mols) of 2-ethyl-1,3-hexanediol, 216 grams (2.73 mols) of pyridine, and 500 cc. of ethyl ether held at 15°–20° C. were slowly added 331 grams (1.24 mols) of p-tert-butylphenyl dichlorophosphate. The reaction mixture was agitated at 25° C. for four hours, and then filtered. The filtrate was stripped by distillation to a kettle temperature of 70° C. under 40 mm. of mercury pressure, dissolved in 500 cc. of xylene, washed with 1,500 cc. of water, and dried, using sodium sulfate, and pot distilled at 120° C. under 5 mm. of mercury pressure. The residue was distilled at 124° C. under 10 microns of mercury pressure in a falling film type still, yielding 204 grams of 2-(p-tert-butylphenoxy)-5-ethyl-2-oxo-4-propyl - 1,3,2 - dioxaphosphorinane as a viscous colorless distillate having a specific gravity at 30°/15° C.=1.088; and $n_D^{30°}$=1.4955.

*Example 11*

One mol (185 grams) of sodium 2,4-dichlorophenoxide was suspended in a solution consisting of 217 grams (0.9 mol) of 5-butyl-2-chloro-5-ethyl-2-oxo-1,3,2-dioxaphosphorinane, and 1.8 grams of triethylamine as catalyst in 400 grams of xylene, while stirring for 3 hours at 100°–110° C. The reaction mixture then was washed with water until neutral and stripped by pot distillation to a kettle temperature of 100° C. under 1 mm. of mercury pressure. The residual 5-butyl-2-(2,4-dichlorophenoxy)-5-ethyl-2-oxo-1,3,2-dioxaphosphorinane had a specific gravity at 25°/15° C.=1.271; and $n_D^{30°}$=1.5151. It had a phosphorus content of 8.77% (theory=8.43%); and a chlorine content of 18.50% (theory=19.32%).

*Example 12*

Following the general procedure described in Example 12, but substituting one mol of dry sodium p-nitrophenoxide for the sodium 2,4-dichlorophenoxide, and 84% yield was secured of 5-butyl-5-ethyl-2-(p-nitrophenoxy)-2-oxo-1,3,2-dioxaphosphorinane in the form of a liquid having a specific gravity at 25°/15° C.=1.242; $n_D^{30°}$=1.5211; and a phosphorus content of 9.06% by weight (theory=9.02%).

*Example 13*

To an agitated solution of 200 cc. of benzene, 120 grams (2 mols) of 99% isopropanol, and 158 grams (2 mols) of pyridine maintained at 25°–30° C. there was added dropwise during 25 minutes a solution consisting of 50 cc. of benzene and 213 grams (1 mol) of 2-chloro-5-methyl-2-oxo-5-propyl - 1,3,2 - dioxaphosphorinane. After heating the reaction mixture at 70° C. for 4 hours it was filtered and the filtrate was stripped by distillation to a kettle temperature of 100° C. under a pressure of less than 2 mm. of mercury. The residue was washed with dilute aqueous sodium hydroxide, and then with water until neutral to litmus. The liquid residue then was stripped by distillation at a kettle temperature of 100° C. under a pressure of less than 2 mm. of mercury, yielding as final product, 5-methyl-2-oxo-2-(2-propoxy)-5-propyl-1,3,2-dioxaphosphorinane as a liquid having the following properties: $n_D^{30°}$=1.4437; specific gravity at 25°/15° C.=1.196; phosphorus, percent by weight=13.26% (theory=13.11%).

*Example 14*

To a 32% aqueous solution prepared by mixing 7 mols of sodium phenoxide and water, maintained at 0°–5° C., there was added during 50 minutes 1518 grams (6.7 mols) of 2-chloro-5-ethyl-2-oxo-4-propyl - 1,3,2 - dioxaphosphorinane. The reaction mixture was then permitted to come to 25° C. and to stratify. The oil layer was separated, neutralized with 20% aqueous methanolic sodium hydroxide solution, and then washed with water. The washed residue was stripped by distillation at 100° C. under a pressure of less than 2 mm. of mercury, and the stripped residue was stirred for 3 hours at 25° C. with 70 grams of "Magnesol," diluted with benzene, filtered and the filtrate stripped by pot distillation at 100° C. under a pressure of less than 2 mm. of mercury. A portion of the residue was further stripped at 78° C. under an absolute pressure of less than 0.2 mm. of mercury, using a falling film type still and then was distilled at 150° C. under the same pressure and using the same apparatus. The fluid distillate, 5-ethyl-2-oxo-2-phenoxy-4-propyl-1,3,2-dioxaphosphorinane, had the following properties: $n_D^{30°}$=1.4939; phosphorus content, 10.83%, by weight (theory=10.89%).

*Example 15*

To an agitated solution of 0.3 mol of sodium methylate in 138 cc. of dry methanol held at 25°–30° C. there were added dropwise during 30 minutes 50 grams (0.25 mol) of 2-chloro-2-oxo-4,4,6-trimethyl-1,3,2-dioxaphosphorinane. The mixture then was heated at 50° C. for two hours, cooled to 25° C. and filtered. The filtrate was stripped by distillation to a kettle temperature of 60° C. under a pressure of less than 2 mm. of mercury. The residual product was dissolved in 50 cc. of ethyl ether and filtered using a filter aid. The filtrate was stripped by distillation at 100° C. under a pressure of less than 2 mm. of mercury, and was filtered. The filtrate was a water-soluble product having the structure:

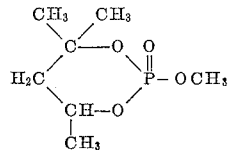

It contained 15.48% by weight of phosphorus (theory= 15.96%) and had an acidity=0.002 cc. of a normal solution of KOH per gram.

In a similar manner the reaction of 5-butyl-2-chloro-5-ethyl-2-oxo-1,3,2 - dioxaphosphorinane and 2,2,2 - trichloroethanol yields 5-butyl-5-ethyl-2-oxo-2 - (2,2,2 - trichloroethoxy)-1,3,2-dioxaphosphorinane; the reaction of 5 - butyl - 2 - chloro-5-ethyl-2-oxo-1,3,2-dioxaphosphorinane and 2-ethylhexanol yields 5-butyl-5-ethyl-2-(2-ethylhexyloxy)-2-oxo-1,3,2-dioxaphosphorinane; the reaction of 2 - chloro-5-ethyl-2-oxo-4-propyl-1,3,2-dioxaphosphorinane and the sodium salt of p-cresol yields 5-ethyl-2-(p - methylphenoxy) - 2 - oxo-4-propyl-1,3,2-dioxaphosphorinane; the reaction of 2-chloro-4,6-dimethyl-2-oxo-1,3,2-dioxaphosphorinane and cyclohexanol yield 2-cyclohexyloxy-4,6-dimethyl-2-oxo-1,3,2 - dioxaphosphorinane; and the reaction of 2-chloro-4-methyl-2-oxo-1,3,2-dioxaphospholane and sodium p-methylphenoxide yields 4-methyl - 2 - (p-methylphenoxy) - 2-oxo-1,3,2-dioxaphospholane.

The same results and products are secured by substituting as reactant in the process for the 2-chloro derivative of a 2-oxo-1,3,2-dioxaphosphorinane or a 2-oxo-1,3,2-dioxaphospholane, the corresponding 2-bromo derivative. For example, the reaction of 2-bromo-5-butyl-5-ethyl-2-oxo-1,3,2-dioxaphosphorinane and 2-ethylhexanol by the process yielded 5-butyl-5-ethyl-2-(2-ethylhexoxy)-2-oxo-1,3,2-dioxaphosphorinane. This is the product made by using as reactant 5-butyl-2-chloro-5-ethyl-2-oxo-1,3,2-dioxaphosphorinane.

The invention is susceptible of modification within the scope of the appended claims.

I claim:

1. Heterocyclic phosphorus containing compounds having structures corresponding to the formula:

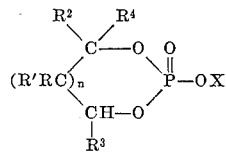

wherein R, R′, R², R³, and R⁴, respectively, designates a radical of the class consisting of hydrogen and the lower alkyl radicals; $n$ is an integer from 0 to 1; and X designates a radical of the class consisting of the alkyl radicals having 1 to 16 carbon atoms, and the cyano-substituted alkoxy-substituted, monocyclic aryloxy-substituted, haloalkoxy-substituted, monocyclic haloaryloxy-substituted, and phenyl-substituted lower alkyl radicals and the cyclohexyl radical.

2. As new compounds, 2-alkoxy 2-oxo-1,3,2-dioxaphosphorinanes.

3. As new compounds, 2-alkoxy-2-oxo-1,3,2-dioxaphosphorinanes wherein the said alkoxy group has at least three carbon atoms, and at least one carbon atom in the heterocyclic ring has at least one lower alkyl group connected therewith.

4. As new compounds, 2-alkoxy-2-oxo-1,3,2-dioxaphosphorinanes wherein the said alkoxy group has at least three carbon atoms, and each of two carbon atoms in the heterocyclic ring has a lower alkyl group connected therewith.

5. As a new compound, 5-ethyl-2-(2-ethylhexyloxy)-2-oxo-4-propyl-1,3,2-dioxaphosphorinane.

6. As a new compound, 5-butyl-5-ethyl-2-(2-ethylhexyloxy)-2-oxo-1,3,2-dioxaphosphorinane.

7. Process for producing 2-substituted oxy derivatives of heterocyclic phosphorus-containing compounds, which comprises reacting, in the substantial absence of added water, a monohydric compound of the class consisting of the alkanols containing 1 to 16 carbon atoms and the cyano-substituted, alkoxy-substituted, monocyclic aryloxy-substituted, haloalkoxy-substituted, monocyclic haloaryloxy-substituted and phenyl-substituted lower alkanols and cyclohexanol, with a compound of the formula:

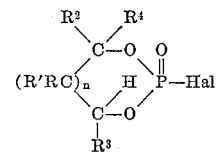

wherein R, R′, R², R³, and R⁴, respectively, designates a radical of the class consisting of hydrogen and the lower alkyl radicals; Hal designates a radical of the class consisting of chlorine and bromine; and $n$ is an integer of from 0 to 1 and eliminating the by-product hydrogen halide as formed, the said monohydric compound and the phosphorus-containing compound being reacted in the ratio from around 1 to around 2.6 mols of the former per mol of the latter, at temperatures within the range from 0° C. to around 125° C.

8. Process for producing 2-substituted oxy derivatives of heterocyclic phosphorus-containing compounds, which comprises reacting in the presence of an inert volatile organic solvent for the reactants and reaction products and in the substantial absence of added water a monohydric compound of the class consisting of the alkanols having 1 to 16 carbon atoms, and the cyano-substituted, alkoxy-substituted, monocyclic aryloxy-substituted, haloalkoxy-substituted, monocyclic haloaryloxy-substituted and phenyl-substituted lower alkanols and cyclohexanol, with a compound of the formula:

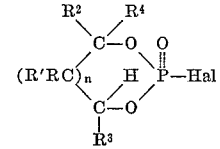

wherein R, R′, R2, R³, and R⁴, respectively, designates a radical of the class consisting of hydrogen and the lower alkyl radicals; Hal designates a radical of the class consisting of chlorine and bromine; and $n$ is an integer of from 0 to 1; and eliminating the by-product hydrogen halide as formed, the said monohydric compound and the phosphorus-containing compound being reacted in the ratio from around 1 to around 2.6 mols of the former per mol of the latter, at temperatures within the range from 0° C. to around 125° C.

9. Process for producing 2-substituted oxy derivatives of heterocyclic phosphorus-containing compounds, which comprises reacting in the substantial absence of added water and in the presence of an inert volatile organic solvent for the reactants and reaction products and of a tertiary amine sequestering agent for the hydrogen halide by-product a monohydric compound of the class consisting of the alkanols having 1 to 16 carbon atoms, and the cyano-substituted, alkoxy-substituted, monocyclic aryloxy-substituted, haloalkoxy-substituted, monocyclic haloaryloxy-substituted, and phenyl-substituted lower alkanols and cyclohexanol, with a compound of the formula:

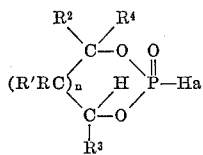

wherein R, R', R², R³, and R⁴, respectively, designates a radical of the class consisting of hydrogen and the lower alkyl radicals; Hal designates a radical of the class consisting of chlorine and bromine; and $n$ is an integer of from 0 to 1; and eliminating the by-product hydrogen halide as formed, the said monohydric compound and the phosphorus-containing compound being reacted in the ratio from around 1 to around 2.6 mols of the former per mol of the latter, at temperatures within the range from 0° C. to around 125° C.

10. Process for producing heterocyclic phosphorus-containing compounds having structures corresponding to the formula

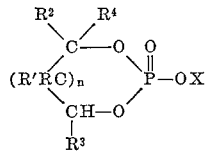

wherein R, R', R², R³, and R⁴, respectively, designates a radical of the class consisting of hydrogen and the lower alkyl radicals; $n$ is an integer of from 0 to 1; and X designates a radical of the class consisting of the alkyl radicals having 1 to 16 carbon atoms and the cyano-substituted, alkoxy-substituted, monocyclic aryloxy-substituted, haloalkoxy-substituted, monocyclic haloaryloxy-substituted and phenyl-substituted lower alkyl radicals and the cyclohexyl radical, which comprises reacting a dihalophosphate ester of the class consisting of the dichlorophosphate esters and the dibromophosphate esters of monohydric compounds of the class consisting of the alkanols having 1 to 16 carbon atoms and the cyano-substituted, alkoxy-substituted, monocyclic aryloxy-substituted, haloalkoxy-substituted, monocyclic haloaryloxy-substituted and phenyl-substituted lower alkanols and cyclohexanol with a solution in a volatile solvent inert to the reactants of a glycol having a structure corresponding to the formula

HOCR₂(CR₂)ₘCHROH wherein each R is selected from the class consisting of hydrogen and the lower alkyl radicals; and $m$ is an integer from 0 to 1.

11. Heterocyclic phosphorus-containing compounds having structures corresponding to the formula:

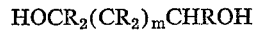

wherein R and R', respectively, designate radicals of the class consisting of hydrogen and the lower alkyl groups; $n$ is of the class consisting of 0 and 1; and X designates a radical of the class consisting of the alkyl radicals having 1 to 16 carbon atoms, and the cyano-substituted, alkoxy-substituted monocyclic aryloxy-substituted, haloalkoxy-substituted, monocyclic haloaryloxy-substituted and phenyl-substituted lower alkyl radicals and the cyclohexyl radical.

12. Heterocyclic phosphorus-containing compounds having structures corresponding to the formula:

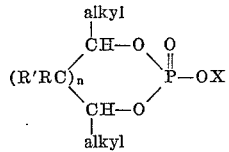

wherein R and R', respectively, designates a radical of the class consisting of hydrogen and the lower alkyl groups; $n$ is of the class consisting of 0 and 1; and X designates a radical of the class consisting of the alkyl radicals having 1 to 16 carbon atoms, and the cyano-substituted, alkoxy-substituted, monocyclic aryloxy-substituted, haloalkoxy-substituted, monocyclic haloaryloxy-substituted and phenyl-substituted lower alkyl radicals and the cyclohexyl radical.

13. Heterocyclic phosphorus-containing compounds having structures corresponding to the formula:

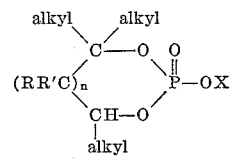

wherein R and R', respectively, designates a radical of the class consisting of hydrogen and the lower alkyl groups; $n$ is of the class consisting of 0 and 1; and X designates a radical of the class consisting of the alkyl radicals having 1 to 16 carbon atoms, and the cyano-substituted, alkoxy-substituted, monocyclic aryloxy-substituted, haloalkoxy-substituted, monocyclic haloaryloxy-substituted and phenyl-substituted lower alkyl radicals and the cyclohexyl radical.

14. Process for producing 2-substituted oxo derivatives of heterocyclic phosphorus-containing compounds, which comprises reacting in the substantial absence of added water a monohydric compound of the class consisting of the alkanols having 1 to 16 carbon atoms, and the cyano-substituted, alkoxy-substituted, monocyclic aryloxy-substituted, haloalkoxy-substituted, monocyclic haloaryloxy-substituted and phenyl-substituted lower alkanols and cyclohexanol with a compound of the formula:

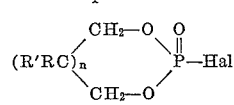

wherein R and R', respectively, designates a radical of the class consisting of hydrogen and the lower alkyl radicals; Hal designates a radical of the class consisting of chlorine and bromine; and $n$ is an integer of from 0 to 1; and eliminating the by-product hydrogen halide as formed, the said monohydric compound and the phosphorus-containing compound being reacted in the ratio from around 1 to around 2.6 mols of the former per mol of the latter, at temperatures within the range from 0° C. to around 125° C.

15. Process for producing 2-substituted oxo derivatives of heterocyclic phosphorus-containing compounds, which comprises reacting in the substantial absence of added water a monohydric compound of the class consisting of the alkanols having 1 to 16 carbon atoms, and the cyano-substituted, alkoxy-substituted, monocyclic aryloxy-substituted, haloalkoxy-substituted, monocyclic haloaryloxy-substituted and phenyl-substituted lower alkanols and cyclohexanol, with a compound of the formula:

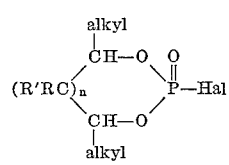

wherein R and R', respectively, designates a radical of the class consisting of hydrogen and the lower alkyl radicals; Hal designates a radical of the class consisting of chlorine and bromine; and $n$ is an integer of from 0 to 1; and eliminating the by-product hydrogen halide as formed, the said monohydric compound and the phosphorus-containing compound being reacted in the ratio from around 1 to around 2.6 mols of the former per mol of the latter, at temperatures within the range from 0° C. to around 125° C.

16. Process for producing 2-substituted oxo derivatives of heterocyclic phosphorus-containing compounds, which comprises reacting in the substantial absence of added water a monohydric compound of the class consisting of the alkanols having from 1 to 16 carbon atoms, and the cyano-substituted, alkoxy-substituted, monocyclic aryloxy-substituted, haloalkoxy-substituted, monocyclic haloaryloxy-substituted and phenyl-substituted lower alkanols and cyclohexanol, with a compound of the formula:

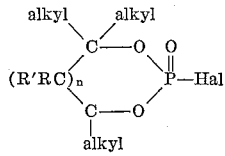

wherein R and R', respectively, designates a radical of the class consisting of hydrogen and the lower alkyl radicals; Hal designates a radical of the class consisting of chlorine and bromine; and $n$ is an integer of from 0 to 1; and eliminating the by-product hydrogen halide as formed, the said monohydric compound and the phosphorus-containing compound being reacted in the ratio from around 1 to around 2.6 mols of the former per mol of the latter, at temperatures within the range from 0° C. to around 125° C.

References Cited in the file of this patent
UNITED STATES PATENTS

| | | |
|---|---|---|
| 2,354,774 | Rummelsburg | Aug. 1, 1944 |
| 2,495,108 | Kosolapoff | Jan. 17, 1950 |
| 2,520,393 | Fletcher | Aug. 29, 1950 |
| 2,557,090 | Gamrath et al. | June 19, 1951 |
| 2,632,767 | Smith et al. | Mar. 24, 1953 |
| 2,661,365 | Gamrath et al. | Dec. 1, 1953 |
| 2,661,366 | Gamrath et al. | Dec. 1, 1953 |

OTHER REFERENCES

Chem. Abst., vol. 42, pp. 4932–4 (1948).
Lucas: J.A.C.S., vol. 72, pp. 5491–7 (1950).
Mitchell et al.: J.A.C.S., 72, 5779 (1950).